(No Model.)

S. SHROYER.
FRUIT PICKER.

No. 374,375. Patented Dec. 6, 1887.

Witnesses
C. M. Hood.
C. M. Carsten.

Inventor
Silas Shroyer.
By his Attorney
H. P. Hood.

N. PETERS, Photo-Lithographer, Washington, D. C.

UNITED STATES PATENT OFFICE.

SILAS SHROYER, OF MOORE'S VINEYARD, INDIANA.

FRUIT-PICKER.

SPECIFICATION forming part of Letters Patent No. 374,375, dated December 6, 1887.

Application filed March 30, 1887. Serial No. 232,954. (No model.)

*To all whom it may concern:*

Be it known that I, SILAS SHROYER, a citizen of the United States, residing at Moore's Vineyard, in the county of Bartholomew and State of Indiana, have invented a new and useful Improvement in Fruit-Pickers, of which the following is a specification.

My invention relates to an improved device for picking fruit from trees of that class in which the fruit is pulled from the tree and falls into a flexible tube or chute which conducts the fruit to the hand of the operator.

The objects of my improvement are to avoid bruising the fruit, to insure its entrance to the conveyer-tube, and to provide a device of the class mentioned which may be easily and cheaply made and which may be packed for transportation in a small space.

The accompanying drawings illustrate my invention.

Figure 1:
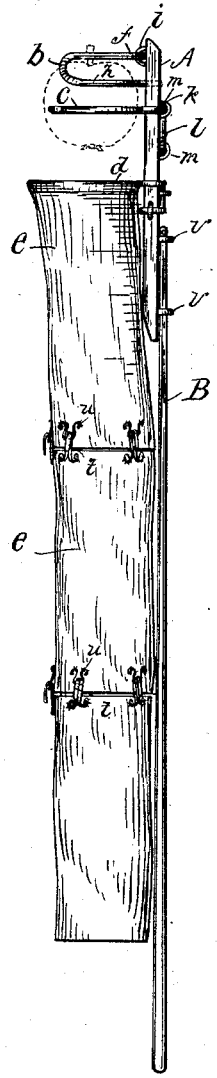
Figure 2:
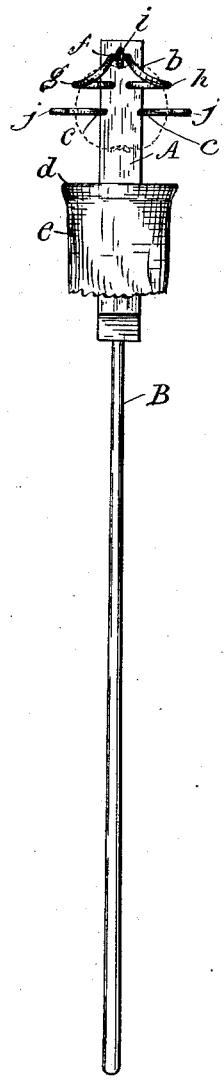
Figure 3:
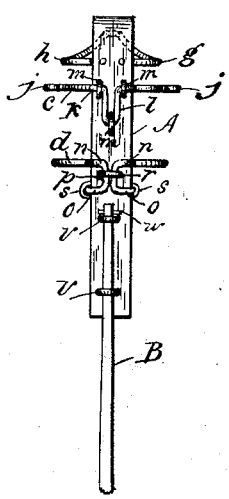
Figure 4:
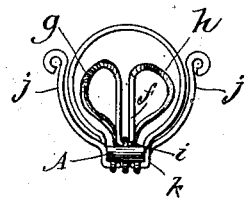

Figure 1 is a side elevation. Fig. 2 is a front elevation. Fig. 3 is a rear elevation without the chute. Fig. 4 is a plan.

A is a short wooden strip, to which is secured the picking-arm $b$, the guard $c$, and the ring $d$, to which the mouth of the flexible tube $e$ is secured. The picking-fork $b$ is formed of a single piece of wire bent to form a narrow loop, $f$, which is adapted to loosely embrace the fruit-stem, and a pair of curved fingers, $g$ and $h$, which are adapted to embrace the upper portion of the fruit, as indicated by dotted lines, Fig. 2. Said fork is secured to strip A near the upper end by a staple, $i$, which engages the closed end of loop $f$, and by passing the ends of the fingers $g$ and $h$ through the strip.

The guard $c$ is formed of a single piece of wire bent to form a pair of arms, $jj$, which are adapted to loosely embrace the fruit at its largest diameter, and a bracket adapted to embrace the back and edges of strip A at $k$, and having a central arm, $l$, arranged at a right angle to the plane of arms $j$. The guard is secured to strip A by staples $m\ m\ m$.

The ring $d$ is formed of a single piece of wire bent to form the ring and two pairs of arms, $n\ n$ and $o\ o$, which are united by a central straight portion, $p$. Ring $d$ is secured to strip A by staples $r$ and $s\ s$. The tube $e$ is made of cloth in several sections, the upper one of which is secured to the ring $d$, and the several sections are detachably connected by hooks $t$ and eyes $u$, secured to the respective sections. This construction of the tube is for the purpose of enabling the operator to adjust the tube to correspond approximately to the length of the handle B, which may be a fishing-pole or other like pole, which is detachably connected to the strip A by passing the pole through a pair of staples, $v\ v$, projecting from the strip, and putting a pin, $w$, through the upper end of the pole.

It is designed to have several poles of different lengths, so that fruit at different heights may be conveniently reached.

In operation the stem of the fruit is passed between the sides of loop $f$ of the picking-arm, while the fingers $g\ h$ embrace and rest upon the upper portion of the fruit. The pressure on the fruit in the act of pulling it off being thus distributed over a considerable surface, the fruit is not bruised. In case the conveyer-tube cannot be held directly beneath the fruit the fruit is prevented from falling to one side, and is guided to the tube by the guard $c$.

I claim as my invention—

1. In a fruit-picker, the combination, with the strip A, ring $d$, secured to the strip, and the flexible tube $e$, secured to the ring, of the picking-fork consisting of a single piece of wire having its ends secured to the strip A above the ring $d$ and bent to form the narrow loop $f$, adapted to receive the stem of the fruit, and the fingers $g$ and $h$, adapted to embrace and rest upon the upper portion of the fruit, substantially as specified.

2. In a fruit-picker, the combination, with the strip A, ring $d$, secured thereto, the flexible tube secured to the ring, and the picking-fork secured to the strip above the ring, of the guard $c$, consisting of a single piece of wire bent to form a central bracket which is adapted to embrace the strip A, and a pair of arms adapted to loosely embrace the fruit at its largest diameter, said guard being secured to the strip between the picking-fork and the mouth of the flexible tube, substantially as and for the purpose specified.

SILAS SHROYER.

Witnesses:
VALENTINE D. AULT,
ROBERT AULT.